Nov. 19, 1929.  J. T. LONGWELL  1,736,410

SNUBBER FOR MOTOR VEHICLE SPRINGS

Filed Aug. 29, 1927

INVENTOR
Joseph T. Longwell
By Jas R Snyder
attorney

Patented Nov. 19, 1929

1,736,410

UNITED STATES PATENT OFFICE

JOSEPH T. LONGWELL, OF PITTSBURGH, PENNSYLVANIA

SNUBBER FOR MOTOR-VEHICLE SPRINGS

Application filed August 29, 1927. Serial No. 216,103.

This invention relates to snubbers for motor vehicle springs, and the primary object of the present invention is to provide a device of the class stated which will operate efficiently to resist abnormal recoil or rebound of the vehicle body under adverse road conditions without liability of breaking the springs or racking the vehicle body, which permits of the variable movements of the vehicle body without cramping or binding the working parts of the snubbing mechanism, and which may be readily installed in any type of motor vehicle without the use of any additional materials except that embodied in the invention itself.

Further objects of the invention are to provide a device of the character described, in a manner as hereinafter set forth, which is simple in its construction and arrangement, strong, durable and efficient in its use, compact, positive in its action, and inexpensive to manufacture, and install.

To the accomplishment of these and other objects as may hereinafter appear, the invention consists of the novel construction, combination and arrangement of parts herein specifically described and illustrated in the accompanying drawing, wherein is shown an embodiment of the invention, but it is to be understood that changes, variations and modifications may be resorted to which come within the scope of the claim hereunto appended.

In the drawing wherein like numerals of reference designate corresponding parts throughout the several views:—

Figure 1:
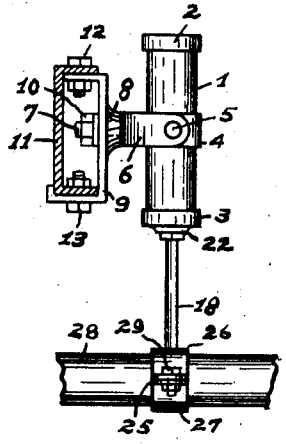
Figure 1 is a rear elevational view of a snubber, constructed in accordance with the invention, and illustrating its attachment to associated parts of a motor vehicle.
Figure 2:
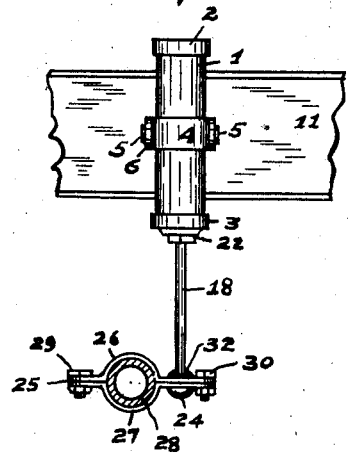
Figure 2 is a side elevational view thereof.
Figure 3:
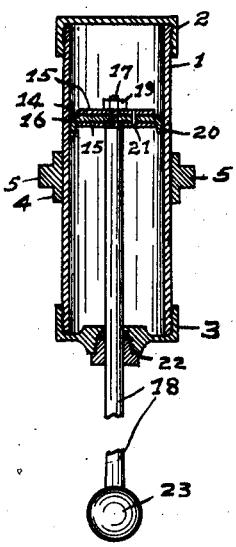
Figure 3 is a vertical cross sectional view of the device.
Figure 4:
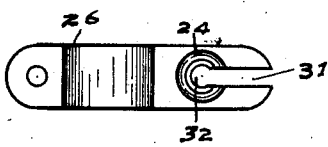
Figure 4 is a top plan view of the upper section of the piston rod shackle.

Referring in detail to the drawing, 1 denotes a vertically disposed air cylinder provided with threadedly secured end caps, respectively indicated at 2 and 3. A trunnion ring 4, provided with a pair of integrally formed, and diametrically disposed trunnion pins 5, is fixedly secured around the cylinder 1, centrally of the length of the latter. The trunnion pins 5 are pivotally mounted in respective outer ends of a trunnion yoke 6. The rear end of the latter carries an integrally formed pivoting stem 7, which extends through a bearing 8 forming a portion of the attaching bracket 9. The free end of the pivoting stem 7 is threaded and is engaged by a nut 10 which maintains the latter in the bearing 8. The attaching bracket 9 is fixedly connected to the motor vehicle frame 11, by means of a pair of bolts, respectively indicated at 12 and 13.

A piston 14 is slidably mounted in the cylinder 1 and consists of a pair of annular plates 15 having a cup washer 16 clamped therebetween. The piston 14 is secured to the reduced threaded end 17, of the piston rod 18, by means of a nut 19. The cup washer 16 is preferably constructed from leather, or any other suitable material and the annular flange 20 thereof is disposed downwardly, so that resistance is established when the piston 14 travels in the downward direction in the cylinder 1 or when the latter moves upwardly on the piston 14. The piston 14 is formed with a small aperture 21 provided for the passage of air to permit of the normal function of the piston 14 in the cylinder 1.

The piston rod 18, extends through a stuffing box 22 which is provided in the cylinder cap 3. The lower end of the piston rod 18 carries an integrally formed ball 23, which is swivelly connected in the socket 24 formed in the axle shackle 25.

The shackle 25, consists of an upper and a lower section, respectively indicated at 26 and 27, which are fixedly clamped around the motor vehicle axle 28 by a pair of bolts 29 and 30. The upper shackle section 26 is formed with an open slot 31, which opens into aperture 32 formed in the socket 24 for the passage of the piston rod 18.

The pivotal connection of the trunnion yoke 6 with the attaching bracket 9, and the pivotal connection of the cylinder 1 with the trunnion yoke 6, together with the ball and socket connection of the piston rod 18 with the axle shackle 25, automatically effects the proper relative alignment of the cylinder 1, piston 14 and piston rod 18, and permits of the variable movements of the motor vehicle without cramping or binding the working parts of the snubbing mechanism.

My improved snubber mechanism will operate efficiently to resist abnormal throw of the motor vehicle body under adverse road conditions, without liability of breaking the springs or rocking the vehicle, and produces a steadying effect when the vehicle is travelling upon roads in the ordinary condition.

What I claim is:

In combination, a snubber of the character described for motor vehicle springs comprising an air cylinder provided with a pair of diametrically opposed trunnion pins, a yoke pivotally connected to the motor vehicle frame, said yoke pivotally engaging said trunnion pins and supporting said air cylinder, a piston mounted in said air cylinder, a piston rod having its upper end fixed to said piston, a laterally disposed shackle fixed to the motor vehicle axle, said shackle consisting of an upper and a lower section, said upper and lower sections formed to combinedly provide a socket, the lower end of said connecting rod having a ball pivotally engaging in said socket, said piston provided with an air passage and including a flexible cup washer having a downwardly disposed peripheral flange for creating resistance when said motor vehicle frame and axle are shifting in the separating direction, substantially as described and for the purpose set forth.

In testimony whereof I affix my signature.

JOSEPH T. LONGWELL.